United States Patent Office 3,686,027  
Patented Aug. 22, 1972

3,686,027
WELDING ELECTRODE FOR JOINING COPPER-NICKEL ALLOYS
Walter A. Petersen, Ridgewood, N.J., assignor to The International Nickel Company, Inc., New York, N.Y.
No Drawing. Original application July 1, 1968, Ser. No. 741,286, now Patent No. 3,560,273, dated Feb. 2, 1971. Divided and this application Apr. 3, 1970, Ser. No. 29,380
Int. Cl. B35k 35/00, 35/04
U.S. Cl. 117—205
8 Claims

ABSTRACT OF THE DISCLOSURE

A flux covered welding electrode for welding copper-nickel alloys, particularly those containing chromium. If chromium is absent from flux, weld cracking is likely. In addition to chromium, flux contains calcium carbonate, cryolite, titania, silicon and titanium. Use of manganese carbonate and bentonite beneficial.

---

The present application is a division of my copending U.S. application Ser. No. 741,286 filed July 1, 1968, now Patent No. 3,560,273.

As set forth in my application Ser. No. 707,967, filed Feb. 26, 1968, now Patent No. 3,545,945, and copending herewith, the introduction of special amounts of chromium into otherwise age-old, conventional copper-nickel alloys (cupronickels) of the 70/30 type brought about a remarkable improvement in mechanical characteristics, notably tensile strength. However, as further set forth, an attendant "weldability problem" arose, a problem which, suffice to say, obscured the commercial potential and development of these new high strength materials.

In any event, a bare metal filler composition (decribed in said Patent No. 3,545,945) was devised which, in retrospect, must be said to have but partially eliminated the difficulty. For, as will be illustrated herein, a situation somewhat unexpected came about. When the identical bare filler metal composition which had given such satisfactory results theretofore was used in conjunction with a flux coating, i.e., a flux covered electrode, failure reappeared. This seemed particularly anomolous since the flux itself was one which had performed successfully in welding of the standard, conventional 70/30 cupronickels.

There is little question that the used of flux covered electrodes has been replaced in many applications by automatic (and semiautomatic, for that matter) inert gas shielded-arc-welding, as exemplified by both the TIG (gas shielded tungsten-arc) and MIG (gas metaal arc) techniques. Nonetheless, there are industrial and commercial applications in which such techniques have extremely limited, if any, utility. And thus recourse to covered electrodes or the like is unavoidable, due regard being given to present welding technology.

The use of covered electrodes can be understood by reference to the primary area of application of the cupronickels, to wit, marine service. Consider, for example, the shipboard installation (or repair) of high pressure piping systems common to any number of naval vessels. Whether it be installation or repair, the weld work in respect of such systems is often preformed under the most limited and cramped conditions, other piping and components being in close proximity. Actually, welders are not infrequently forced to use mirrors simply to see the area to be welded. If for no other reason, the sheer bulk of inert gas shielded-arc welding equipment would restrict proper manipulation thereof under such conditions to the point of total futility. It might also be added that covered electrodes are not without other advantages, including lower initial cost of equipment, simplicity with which a job can be set up (amenability to short runs), and usefulness in field welding, particularly maneuverability.

The theory which might possibily explain the metallurgical phenonmenon involved is not completely understood. As was the case with the bare metal filler material, chormium seemingly plays a most important role, but, however, in a most different fashion. If this constituent—the element responsible for the striking increase in strength in the first place—is found in the core material (i.e., core wire) but not in the flux, undesirable cracking can too easily result. But if contained in the flux in a proper amount, weld cracking can be avoided, particularly if other prerequisites herein described are met.

It has now been discovered that sound, high strength substantially crack-free, copper-nickel-chromium welds (and overlays), welds which are also substantially non-porpous, ductile, tough and corrosion resistant, can be produced particularly in respect of applications in which bare filler metal compositions per se would be unsuitable or impractical. As described in greater detail infra, this requires a special combination of flux and core wire. The covered electrode in accordance herewith is further characterized in that it is an all-position welding element, offering ease of operation in the flat, vertical, and overhead welding position. In addition, slag that forms during welding is easily removable by light chipping—it has been observed to break away from deposits by itself. Usually only light wire brushing is required between weld passes.

Of further importance, weld deposits are readily obtained having tensile strengths comparable to the welded copper-nickel-chromium base metal. Moreover, post weld heat treating is not required, and this is most significant when due consideration is given to the conditions under which such electrodes are likely to be used, i.e., where space is at a premium. If post weld heat treating were required, the utility of the flux covered electrode would be greatly curtailed.

It is an object of the invention to provide a new and improved chromium-containing flux composition suitable for use in welding copper-nickel alloys, particularly high strength, chromium-containing copper-nickel alloys.

The invention also contemplates providing a flux covered electrode, the flux and core material coacting to produce sound, substantially crack-free and nonporous weld deposits in respect of copper-nickel alloy base members.

Another object of the invention is to provide new and improved welded structures in which the weld deposit and at least one other member is of a high strength, chromium-containing cupronickel.

Other object and advantages will become apparent from the following description.

Generally speaking and in accordance herewith, the present invention contemplates using a special flux covered electrode to weld copper-nickel alloy base members containing about 24% to 38% nickel, and particularly with at least one member containing about 2.4% to 3.8% chromium (as described in the U.S. patent application of Frank A. Badia and Gary N. Kirby, Ser. No. 708,973 filed on Feb. 28, 1968 now Patent No. 3,498,279.) Other constituents which can be present in one or more of the members are as follows: up to 2.5%, e.g., up to 1%, iron; up to 2.5% cobalt, with the sum of the chromium, iron and cobalt not exceeding about 5%; up to 6% zinc; up to 3% manganese; up to 0.8% zirconium; up to 0.5% each of silicon, titanium, aluminum, columbium and beryllium; up to 0.1% carbon; up to 0.1% magnesium; and the balance essentially copper.

In terms of composition, the flux of the subject invention is comprised of about 10% to 40% calcium carbonate, about 5% to 40% cryolite, up to 30% manganese carbonate, about 10% to 35% titania, about 7% to not more than 13% chromium, about 0.6% to 1.7% silicon, about 0.5% to 1.6% titanium, and up to about 5%, e.g., 2% to 5%, bentonite. Usually a water dispersible binder such as sodium silicate, potassium silicate, and the like is used to promote the formation of a relatively hard and durable coating subsequent to drying as by baking.

Calcium carbonate primarily serves the function of providing the relatively inert shielding gas carbon dioxide which shields the deposit from the atmosphere. It also assists in the cleansing of the weld metal and while it can be present in an amount from 10% to 40%, a range of 16% to 24% is deemed most beneficial for ease of operation, good shielding effect and minimization of the tendency for difficultly removable powdery slag to form. In respect of cryolite, the principal role thereof is its action as a cleaning agent. It promotes the removal of oxides from the weld pool and also contributes to imparting weld soundness. By maintaining the content thereof from 16% to 24%, difficulty that otherwise might be encountered with regard to subsequent slag removal is greatly lessened.

With regard to manganese carbonate, it chemically breaks down during the welding process into, inter alia, manganese and carbon dioxide, the latter performing, as indicated herein, as a shielding gas. It is of considerable benefit with respect to ease of slag removal and thus it is advantageous that the flux contain this constituent, particularly within the range of 16% to 24%. The relatively high amount of manganese introduced into the weld deposit does not exert a detrimental influence. Titania serves as an arc stabilizer and provides a spray-type transfer. As a result, a welder is permitted greater freedom of movement in tight or close quarters than otherwise might be the case. With too small a quantity of titania, an obnoxious powdery slag is likely to form; on the other hand, if present to the excess, weld cracking is apt to follow. From 16% to 24% titania gives highly satisfactory results.

As referred to herein, if chromium is found in the core material but not in the flux, weld cracking is likely. Chromium, the principal strengthening element, is transferred across the arc from the coating, complete alloying taking place during the fusion process. The flux chromium powder remains the principal source of chromium ultimately found in the weld deposit, notwithstanding the percentage thereof in the base metal (member) since but a small amount of the latter is obtained in the deposit via dilution. This is particularly true in heavy section welds. Taking this low dilution factor into account and with the view of obtaining deposits of high strength, at least 10% chromium should be in the flux in the welding of sections 1 inch in thickness or more and at least 9% chromium for, say, ½ inch thick welds. This enables obtaining weld deposits having a yield strength on the order of about 50,000 p.s.i. (and above), a strength level comparable to that characteristic of the chromium-containing cupronickels under consideration. Yield strengths of 40,000 p.s.i. can be achieved consistently with down to 7% chromium in the flux, though at least 8% is preferred.

Simply using high chromium levels, however, is not a complete panacea unto itself since, as will be shown herein, excess chromium has been found to promote or is causative of cracking in heavy section welds. Thus in welding heavy sections of one inch or greater, it is of considerable benefit to control the chromium content of the flux such that it does not exceed about 12%.

The function of silicon is of particular importance. It increases the fluidity of the slag and weld metal and also acts as a deoxidizer. More importantly perhaps and particularly in heavy section welds, i.e., about one inch or greater, if an insufficient amount is present, weld cracking will ensue. But by the same token, however, and under the same conditions with all other factors remaining equal, an excessive amount of silicon can bring about cracking as will be shown herein. Accordingly, while necessary to prevent cracking, particularly in heavy sections and particularly at chromium levels at, say, 11% or 12%, it must also be controlled to inhibit cracking. While a silicon content of 0.8% to 1.4% is quite advantageous, for welding sections of about one inch or more in thickness, the respective amounts of chromium and silicon should be correlated as set forth in Table I.

TABLE I

| Percent chromium | Percent silicon |
|---|---|
| 9 | 0.75–1.3 |
| 10 | 0.9–1.25 |
| 11 | 0.95–1.2 |
| 12 | 1–1.2 |

For values intermediate those given in Table I, interpolation should be used. In making the silicon addition, it is preferred to use a nickel-silicon alloy containing 28% silicon, a product commercially available. A 4% addition of this alloy has consistently given excellent results. The use of this master alloy introduces some nickel into the flux but this is, of course, quite unobjectionable since nickel constitutes a high proportion of the core material as well as the base members welded.

In respect of titanium, its primary flux role is as a deoxidant. Amounts significantly below about 0.5% and above 1.6% have resulted in cracked welds in X-weld tests. A range of 1% to 1.5% is most advantageous. As is the case with silicon, it is preferred to add the titanium via a commercially produced nickel-titanium master alloy (26% titanium), the use of 5% of this master alloy having consistently proven to be extremely effective.

For the purpose of giving those skilled in the art a better understanding of the invention, the following examples and data are given:

A significant number of flux compositions were formulated and used in conducting a series of X-weld tests. The compositions of the various fluxes are given and identified in Table II. It should be mentioned that about 15% sodium silicate was added in each instance as a binder. Moreover, since the fluxes were extruded onto the core wires, the flux compositions contained 3% bentonite which performs extremely well in enhancing extrudability. Unless otherwise specified, the composition of base metal members was as follows: 29.3% nickel, 2.95% chromium, <0.07% silicon, 0.71% manganese, 0.08% titanium, 0.79% iron, 0.17% zirconium, the balance being copper and incidental impurities.

TABLE II

| Flux | CaCO3, percent | Na3AlF6, percent | MnCO3, percent | TiO2, percent | Cr, percent | Si, percent | Ti, percent |
|---|---|---|---|---|---|---|---|
| 1-A | 23 | 22 | 22 | 22 | N.a. | 0.84 | 1.3 |
| 1-B | 33 | 32 | 32 | N.a. | N.a. | N.a. | N.a. |
| 1-C | 20 | 20 | 19 | 10 | 10 | 1.12 | 1.3 |
| 1-D | 20 | 20 | 20 | 19 | 9 | 1.12 | 1.3 |
| 1-E | 20 | 19 | 19 | 19 | 11 | 1.12 | 1.3 |
| 1-F | 19 | 19 | 19 | 19 | 12 | 1.12 | 1.3 |

NOTE.—N.a.=none added.

Silicon added as nickel-silicon (28% silicon) master alloy. Titanium added as nickel-titanium (26% titanium) master alloy. Except where silicon and titanium were not added, balance of fluxes was essentially nickel from the master alloy additions.

EXAMPLE I

Chromium-free Flux "1-A" of Table II was extruded (approximately 0.22 inch outside diameter) onto a 5/32 inch diameter cupronickel core wire containing about 30.1% nickel, 2.5% chromium, 0.22% silicon, 0.84% manganese, 0.04% titanium, less than 0.03% zirconium and the balance essentially copper. This core wire composition had been previously successfully employed for tungsten-arc welding. After drying, the covered electrode was used in making an X-weld crack test to simulate the severe conditions encountered in welding heavy sections. (A description of this procedure and illustrations thereof are found in The Welding Journal, vol. 24, November 1946, pp. 769S-775S.)

In conducting the test, two one-inch square by three-inches long bars were clamped with their edges together to form an X joint. Eighteen passes were made, nine on either side, alternating from side to side, using one half of an electrode per pass. Upon completion, the X-weld formed was cut into transverse slices, with four faces being ground, polished, etched and then examined for defects.

While no cracks were found in the heat affected zone (this is true for all tests given herein), an average of about 1.5 cracks were found in each section (weld face), the longest crack observed being about 1/8 inch. Thus, the weld formed using a chromium-free flux was deemed unsatisfactory.

EXAMPLE II

Again using a chromium-free flux, Flux "1-B," and the same mode of operation as set forth in Example I, a core wire containing 30.0% nickel, 2.70% chromium, 0.32% silicon, 0.68% manganese, 0.04% titanium, 0.74% iron, 0.04% zirconium, the balance being essentially copper, was coated by extrusion. The transverse slices cut from the weld exhibited 4.25 cracks per section (17 in all), the length of the longest crack being about 3/32 inch.

EXAMPLE III

Reducing the chromium content of the core wire to the virtual minimum that would be present in a chromium-containing cupronickel base member of minimum strength did not prove to be of significant benefit. Thus, using Flux "1-B" and a core wire containing but 2.35% chromium together with 30.2% nickel, 1.04% manganese, 0.32% silicon, 0.06% titanium, 0.07% zirconium, balance essentially copper, a total of about four cracks per section were observed after conducting the X-weld test in the manner of Example I.

EXAMPLE IV

Using a chromium-free core wire but a chromium-containing flux, Flux "1-C," the X-weld test was once again carried out as described in Example I. The core wire contained, in addition to copper, 31.8% nickel, 0.10% silicon, 0.69% manganese, 0.6% iron and 0.26% titanium. Upon examination of the transverse slices, no cracks were observed. The weld was substantially non-porous and ductile. Analysis of the deposit showed that it contained 29.8% nickel, 2.20% chromium, 1.72% manganese, 0.21% silicon, 0.05% titanium, less than 0.02% zirconium, 0.77% iron, balance copper and impurities.

EXAMPLES V, VI, AND VII

Using chromium-containing Fluxes "1-D," "1-E," and "1-F," three additional tests were carried out in the same manner as in Example I but using a core wire of the composition given in Example IV. In no instance were weld cracks detected. Together with Example IV, these tests demonstrate that excellent welds can be obtained over a chromium (flux) range of 9% to 12%.

EXAMPLE VIII

As indicated above herein, in the welding of thick sections, silicon plays a vital role. As the chromium content of the flux is increased above about 8% or 9%, the silicon must also be increased as reflected in Table I. To illustrate this point, a substantial number of flux compositions are given in Table III. An indication is also set forth as to whether cracking was experienced and if so, the length of the longest crack.

In conducting the X-weld crack tests, which again were carried out in the manner set forth in Example I, base plate members of four different compositions were used, the compositions being as follows:

BPM-1

29.5% Ni, 3.15% Cr, 0.66% Mn, 0.15% Si, less than 0.05% Ti, 0.73% Fe, 0.09% Zr, the balance Cu and impurities.

BPM-2

29.3% Ni, 2.95% Cr, 0.71% Mn, less than 0.07% Si, 0.08% Ti, 0.79% Fe, 0.17% Zr, the balance Cu and impurities.

BPM-3

28.8% Ni, 2.95% Cr, 0.77% Mn, 0.06% Si, 0.08% Ti, 0.79% Fe, 0.17% Zr, the balance Cu and impurities.

BPM-4

28.8% Ni, 2.20% Cr, 0.67% Mn, 0.05% Si (nominal), 0.10% Ti (nominal), 1.0% Fe, 0.020% Zr (nominal), the balance Cu and impurities.

The same core wire composition was used in all tests, the composition being the same as that given in connection with Example IV except one test in which Flux "1-P" was used. In this particular instance, the core wire (chromium-free) contained 31.8% nickel, 0.32% manganese, 0.05% silicon, 0.03% titanium, the balance being copper and impurities.

TABLE III

| Flux [1] | CaCO₃, percent | Na₃AlF₆, percent | MnCO₃, percent | TiO₂, percent | Cr, percent | Si, percent | Ti, percent | Cu, percent | Base plate | Total number of cracks | Length of longest crack, (inch) |
|---|---|---|---|---|---|---|---|---|---|---|---|
| 1-G | 22 | 21 | 20 | 20 | 9 | 0 | 5 | Balance | BPM-1 | 18 | 1/16 |
| 1-H | 22 | 21 | 20 | 20 | 9 | 1.4 | 0 | do | BPM-1 | 28 | 1/32 |
| 1-I | 21 | 20 | 20 | 20 | 9 | 0.56 | 1.3 | do | BPM-1 | 4 | 1/16 |
| 1-J | 20 | 20 | 20 | 20 | 9 | 0.84 | 1.3 | do | BPM-2 | None | |
| 1-K | 20 | 20 | 20 | 20 | 9 | 0.84 | 1.3 | do | BPM-1 | None | |
| 1-L | 21 | 20 | 19 | 19 | 9 | 1.12 | 1.3 | do | BPM-1 | None | |
| 1-M | 20 | 20 | 20 | 19 | 9 | 1.12 | 1.3 | do | BPM-2 | None | |
| 1-N | 20 | 20 | 20 | 19 | 9 | 1.12 | 1.3 | do | BPM-2 | None | |
| 1-O | 20 | 20 | 19 | 19 | 9 | 1.4 | 1.3 | do | BPM-3 | 1 | 1/32 |
| 1-P | 20 | 20 | 19 | 19 | 9 | 1.4 | 1.3 | do | BPM-4 | 14 | 1/8 |
| 1-Q | 21 | 20 | 19 | 19 | 9 | 1.4 | 1.04 | do | BPM-1 | 2 | 1/32 |
| 1-R | 21 | 20 | 20 | 20 | 9 | 1.4 | 0.52 | do | BPM-1 | 10 | 1/32 |
| 1-S | 21 | 19 | 19 | 18 | 9 | 1.4 | 1.56 | do | BPM-1 | 8 | 1/32 |
| 1-T | 21 | 18 | 18 | 18 | 9 | 1.4 | 2.08 | do | BPM-1 | 18 | 1/16 |
| 1-U | 20 | 20 | 20 | 19 | 10 | 0.84 | 1.3 | do | BPM-2 | 1 | 1/16 |
| 1-V | 20 | 20 | 19 | 19 | 10 | 1.12 | 1.3 | do | BPM-2 | None | |
| 1-W | 20 | 20 | 19 | 19 | 10 | 1.12 | 1.3 | do | BPM-2 | None | |
| 1-X | 20 | 20 | 19 | 19 | 10 | 1.12 | 1.3 | do | BPM-2 | None | |
| 1-Y | 21 | 19 | 19 | 18 | 10 | 1.4 | 1.3 | do | BPM-1 | 10 | 3/32 |
| 1-Z | 20 | 19 | 19 | 19 | 12 | 0.84 | 1.3 | do | BPM-2 | 11 | 1/16 |
| AA | 19 | 19 | 19 | 19 | 12 | 1.12 | 1.3 | do | BPM-2 | None | |
| BB | 21 | 18 | 18 | 18 | 12 | 1.4 | 1.3 | do | BPM-1 | 28 | 1/16 |
| CC | 19 | 19 | 18 | 18 | 14 | 1.12 | 1.3 | do | BPM-2 | 20 | 1/4 |
| DD | 20 | 18 | 18 | 17 | 14 | 1.4 | 1.3 | do | BPM-1 | 80 | 1/8 |

[1] 15% sodium silicate added as binder and water as needed. Also 3% bentonite added. Silicon and titanium added as Ni-Si and Ni-Ti master alloys.

In the tests using Fluxes 1-G and 1-H either silicon or titanium was omitted from the flux and as a consequence the results were quite poor. The experiments involving Fluxes 1-I through 1-T should be considered together. In each of this series of tests the chromium was held constant, to wit, at the level of 9%. Flux 1-I contained an insufficient amount of silicon—thus cracking was experienced. When this silicon level (0.56%) was raised to 0.84% or 1.12% as shown by Fluxes 1-J through 1-N, there was a complete absence of cracking. Raising the silicon content to 1.4%, however, resulted in cracking as particularly evident from Fluxes 1-O and 1-P. This confirms what has been previously stated herein—while silicon is needed to prevent cracking it can, unless controlled, be present in amounts sufficiently high to bring about cracking. This adverse effect was not remedied by changing the percentage of titanium or other flux constituents as is reflected by Fluxes 1-Q through 1-T.

The pattern of behavior experienced with the fluxes containing 9% chromium was also encountered with other groups of fluxes in which the chromium content was maintained constant. Thus with regard to Fluxes 1-U through 1-Y the level of chromium was held at 10% and the data indicate the presence or absence of cracks was dictated by the amount of silicon present. The same can be seen for Fluxes 1-Z, AA and BB in which the amount of chromium was controlled at 12%. The X-weld crack tests using Fluxes CC and DD are included for the purpose of demonstrating that at a chromium level of 14%, cracking was rather severe regardless of the fact that an amount of silicon (1.12%) was used which had given excellent results in respect of the tests using Fluxes 1-L, 1-M, 1-N, 1-V, 1-W and 1-X. And raising the silicon content served but to aggravate the situation. Accordingly, for consistently achieving highly satisfactory results, the percentage of chromium in the flux should not exceed about 13%.

EXAMPLE IX

In addition to the X-weld tests described above, a number of butt-welds was also prepared and tested. Generally speaking, plates ½ inch thick, 2¾ inches in width and 5 to 6 inches in length were used, the plates being beveled along the 5 inch edge at an angle of 30°. The sharp edge was broken by grinding to provide a 1/16 inch root face. The plates were placed upon a copper-faced steel platen (2 inches thick) with a distance therebetween of about 1/16 inch. The plates were restrained by clamping to the platen, two heavy duty C-clamps on either side being used. Preheating was not employed and the temperature between passes was maintained below about 200° F. No postweld heat treatment was used.

In addition to the base plate identified above as BPM-4, other base plate member compositions were employed as follows:

BPM-5

29.1%, Ni, 3.75% Cr, 0.43% Mn, 0.05% Si (nominal), 0.10% Ti, 0.82% Fe, 0.20% Zr (nominal), balance Cu and impurities.

BPM-6

29.1% Ni, 3.0% Cr, 0.76% Mn, 0.09% Si, 0.04% Ti, 0.51% Fe, 0.03% Zr, balance Cu and impurities.

BPM-7

29.6% Ni, 2.92% Cr, 0.61% Mn, 0.05% Si, 0.07% Ti, 0.17% Fe, 0.13 Zr, balance Cu and impurities.

The compositions of the various core wires employed are set forth below:

CW-1

31.8% Ni, 0.69% Mn, 0.10% Si, 0.26% Ti, 0.60% Fe, balance Cu and impurities (same as fluxes in Table III, except Flux 1-P).

CW-2

32.9% Ni, 0.94% Mn, 0.09% Si, 0.25% Ti, 0.36% Fe, balance Cu and impurities.

CW-3

29.8% Ni, 0.72% Mn, 0.09% Si, 0.27% Ti, 0.53% Fe, 0.02% C, balance Cu and impurities.

Welds were formed from the flat, vertical and overhead positions. (For overhead welding, the assembly was inverted and bolted to a fixture about 6 feet above the floor to enable the welding operation to be carried out.) The amperage used depended upon the core wire diameter, approximately 60 amps being used for wires 3/32 inch in diameter, 80 amps for wires 1/8 inch in diameter and about 100 amps for wires 5/32 inch in diameter. The joints were radiographically inspected using a 300 kilovolt ampere (KVA) X-ray unit. The results of the radiographic inspection tests are reported in Table IV together with flux composition, base plate and core wire identification and whether the butt-weld was in the flat, vertical or overhead position.

TABLE IV

| Flux | CaCO₃, percent | Na₃AlF₆, percent | MnCO₃, percent | TiO₂, percent | Cr, percent | Si, percent | Ti, percent | Cu, percent | Base plate | Core wire | Position | Radiographic inspection |
|---|---|---|---|---|---|---|---|---|---|---|---|---|
| EE | 21 | 20 | 20 | 20 | 7 | 1.12 | 1.3 | Balance | BPM-7 | CW-1 | Flat | No cracks; very slight porosity. |
| FF | 20 | 20 | 20 | 20 | 9 | 0.84 | 1.3 | do | BPM-7 | CW-1 | do | No cracks; nonporous. |
| GG | 20 | 20 | 20 | 20 | 9 | 0.84 | 1.3 | do | BPM-7 | CW-1 | do | Do. |
| HH | 20 | 20 | 19 | 20 | 9 | 1.12 | 1.3 | do | BPM-4 | CW-1 | Overhead | Do. |
| II | 20 | 20 | 19 | 20 | 9 | 1.12 | 1.3 | do | BPM*-6 | CW-1 | Vertical | Do. |
| JJ | 20 | 20 | 19 | 20 | 9 | 1.12 | 1.3 | do | BPM*-6 | CW-1 | Flat | Do. |
| KK | 21 | 19 | 19 | 19 | 9 | 1.4 | 1.3 | do | BPM-5 | CW-2 | Overhead | No cracks; 3 pores. |
| LL | 21 | 19 | 19 | 19 | 9 | 1.4 | 1.3 | do | BPM-4 | CW-1 | Flat | No cracks; nonporous. |
| MM | 21 | 19 | 19 | 19 | 9 | 1.4 | 1.3 | do | BPM-4 | CW-2 | Vertical | No cracks; 6 pores. |
| NN | 20 | 20 | 19 | 19 | 10 | 1.12 | 1.3 | do | BPM*-7 | CW-1 | Flat | No cracks; nonporous. |
| OO | 20 | 20 | 19 | 19 | 10 | 1.12 | 1.3 | do | BPM-7 | CW-2 | Overhead | No cracks; 4 pores. |
| PP | 20 | 20 | 19 | 19 | 10 | 1.12 | 1.3 | do | BPM-4 | CW-3 | Vertical | No cracks; 6 pores. |
| QQ | 20 | 19 | 19 | 19 | 11 | 1.12 | 1.3 | do | BPM*-7 | CW-2 | Flat | No cracks; nonporous. |

*Joint thickness 1 inch rather than ½ inch. 3% bentonite and 15% sodium silicate and water as needed added to flux in each instance. Ni-Si and Ni-Ti master alloys used.

From the data given in Table IV, it will be observed that in no instance was weld cracking observed. In those tests where pores were detected, it can be said that the pores were extremely few and randomly distributed. The degree of porosity was minimal at worst and well within, for example, current military specifications which permit up to 20 pores in a six-inch length in respect of ½ inch thick welds for cupronickels of the 70/30 type. Transverse slices taken from the welded joints confirmed the X-ray results and showed that the welds were free from objectionable defects. Slag was noted in the weld joint using Flux II, but this was expected since a core wire 5/32 inch in diameter was used in the vertical position. This is too large as will be appreciated by those skilled in the art, a maximum core wire diameter of 3/32 inch being recommended for vertical welding.

In addition to the foregoing, tensile tests were made in respect of the weld deposits formed using fluxes EE and QQ. The compositions of the deposits and mechanical properties are given in Table V below:

TABLE V

| Flux | Ni, percent | Cr, percent | Mn, percent | Si, percent | Ti, percent | Y.S. (K s.i.) | U.T.S. (K s.i.) | El., percent | R.A. percent | C.V.N. (ft.-lbs.) |
|---|---|---|---|---|---|---|---|---|---|---|
| EE | 30.4 | 1.59 | 1.74 | 0.13 | 0.03 | 46 | 67.6 | 18.5 | 45 | 45 |
| QQ | 30.6 | 2.75 | 2.04 | 0.24 | 0.24 | 54.2 | 78.6 | 17 | 44.8 | 44 |

Note.—The balance of the compositions was virtually all Cu, the alloys containing not more than 0.05% Ti, 0.03% Zr and 0.75% Fe.

It will be noted the yield strength of the weld deposit formed using Flux EE did not reach 50,000 p.s.i., the flux containing but 7% chromium, whereas Flux QQ, with 11% chromium, resulted in a yield strength well above 50,000 p.s.i. As indicated before herein, the flux should contain at least 9% chromium where yield strengths on the high side are desired. It should also be mentioned that the other mechanical characteristics of the weld deposits were satisfactory.

In the light of all the foregoing, a particularly satisfactory flux composition which has consistently given excellent results contains 19% to 21% (20%) calcium carbonate, 19% to 21% (20%) cryolite, 19% to 21% (20%) manganese carbonate, 19% to 21% (20%) titania, about 9% to 11% (10%) chromium, about 0.8% to 1.2% (1.1%) silicon, about 1.1% to 1.4% (1.3%) titanium, and about 2% to 4% (3%) bentonite. To this should be added a binder, advantageously sodium silicate solution (say, 47° Baumé) in an amount of 10% to 20% (15%) by weight of the flux. This is recommended in producing all electrodes.

In addition to joining a high strength chromium cupronickel to itself, as well as to chromium-free copper-nickel alloys of standard composition, notably the 70/30 type, flux covered electrodes of the present invention can also be used in joining wrought to cast chromium-containing cupronickels. Core wires contemplated herein should be of the same general composition as the chromium-free base plate composition described hereinbefore.

Although the present invention has been described in conjunction with preferred embodiments, it is to be understood that modifications and vairations may be resorted to without departing from the spirit and scope of the invention, as those skilled in the art will readily understand. For example, since the silicon and titanium can be inporated into the flux via nickel-silicon and nickel-titanium master additions, fluxes within the invention can contain up to about 8.85% nickel, although a smaller amount would be used when less than the maximum of these constituents were present. For example, approximately 7.85% nickel would be found in the flux should 1.4% silicon and 1.5% titanium be present. It is preferred, however, not to introduce the silicon, titanium (also chromium), in the form of ferrous products, i.e., ferro-silicon and ferrotitanium. The chromium is preferably added to the flux as electrolytic chromium powder. As to extrusion aids, others which might be used, apart from bentonite, include alginates and mica. Such modifications and variations are considered to be within the purview and scope of the invention and appended claims.

I claim:

1. A welding electrode for welding copper-nickel alloys and comprised of a core element encompassed by a flux, the core wire containing about 24% to 38% nickel, up to 2.5% iron, up to 2.5% cobalt, up to 6% zinc, up to 3% manganese, up to 0.8% zirconium, up to 0.5% each of silicon, titanium, aluminum, columbium and beryllium, up to 0.1% carbon, up to 0.1% magnesium, and the balance essentially copper, with the flux containing a binder and about 10% to 40% calcium carbonate, about 5% to 40% cryolite, up to 30% manganese carbonate, about 10% to 35% titania, about 7% to not more than 13% chromium, about 0.6% to about 1.7% silicon, about 0.5% to 1.6% titanium, and up to 5% bentonite.

2. A welding electrode in accordance with claim 1 in which the flux contains 19% to 21% each of calcium carbonate, cryolite, manganese carbonate and titania, 9% to 11% chromium, 0.8% to 1.2% silicon, 1.1% to 1.4% titanium and about 2% to 4% bentonite.

3. A welding electrode in accordance with claim 1 in which the flux contains up to about 8.85% nickel.

4. A welding electrode in accordance with claim 1 in which the chromium and silicon in said flux are correlated as follows:

| Percent chromium | Percent silicon |
|---|---|
| 9 | 0.75–1.3 |
| 10 | 0.9–1.25 |
| 11 | 0.95–1.2 |
| 12 | 1–1.2 | with values intermediate those given above being obtained by interpolation.

5. A welding electrode in accordance with claim 1 in which the flux contains 16% to 24% calcium carbonate, 16% to 24% cryolite, 16% to 24% manganese carbonate, 16% to 24% titania, about 8% to 12% chromium, about 0.8% to 1.4% silicon, and about 1% to 1.5% titanium.

6. A welding electrode in accordance with claim 5 in which the flux contains 2% to 5% bentonite.

7. A welding electrode in accordance with claim 1 in which the binder is silicate.

8. A welding electrode in accordance with claim 7 in which the binder is sodium silicate.

References Cited

UNITED STATES PATENTS

| | | | |
|---|---|---|---|
| 2,745,771 | 5/1956 | Pease et al. | 117—205 |
| 3,107,176 | 10/1963 | Witherell | 117—205 |

ALFRED L. LEAVITT, Primary Examiner

M. F. ESPOSITO, Assistant Examiner

U.S. Cl. X.R.

117—206, 207

PO-1050
(5/69)

UNITED STATES PATENT OFFICE
CERTIFICATE OF CORRECTION

Patent No. 3,686,027      Dated August 22, 1972

Inventor(s) WALTER ADRIAN PETERSEN

It is certified that error appears in the above-identified patent and that said Letters Patent are hereby corrected as shown below:

Column 1, line 37, for "(decribed " read "(described "

line 48, for "used" read "use";

line 52, for "(gas metaal arc)" read "(gas metal arc)";

Column 2, line 3, for "preformed" read "performed";

line 18, for "chormium" read "chromium";

Table II, Flux 1-C, column "$TiO_2$ percent", for "10" read "19";

Column 6, line 1, for "describe din" read "described in";

Claim 7, line 2, after "is" insert "a".

Signed and sealed this 22nd day of January 1974.

(SEAL)
Attest:

EDWARD M. FLETCHER, JR.      RENE D. TEGTMEYER
Attesting Officer      Acting Commissioner of Patents